I. KNIGHT.
Car Truck.
No. 6,524. Patented June 12, 1849.
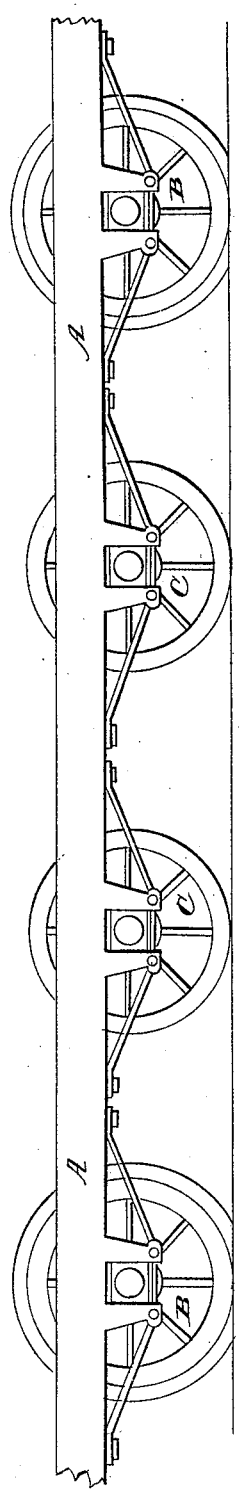
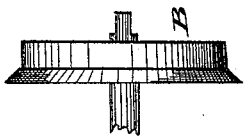
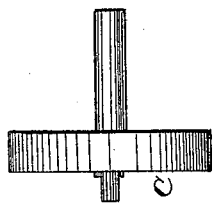
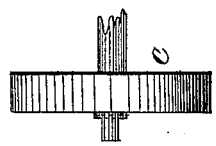
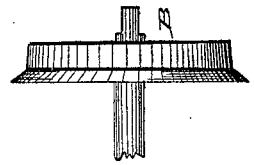

UNITED STATES PATENT OFFICE.

ISAAC KNIGHT, OF BALTIMORE, MARYLAND.

TRUCK FOR RAILROAD-CARS.

Specification of Letters Patent No. 6,524, dated June 12, 1849.

*To all whom it may concern:*

Be it known that I, ISAAC KNIGHT, of Baltimore, in the State of Maryland, have invented certain new and useful Improvements in the Running-Gear of Railroad-Carriages, and that the following is a full, clear, and exact description of the principle or character which distinguishes them from all other things before known and of the usual manner of making, modifying, and using the same, reference being had to the accompanying drawings, in which—

Figure 1, represents an eight wheeled car frame.

In the ordinary way of constructing carriages for carrying burdens and passengers upon railroads, the wheels are made conical, with flanges on their inside, and fast to and revolve with their axle. This conical form is for the purpose of passing around the curves of the road without causing the flanges of the wheels to impinge so much against the edge or side of the rail, as would be the case if these wheels were cylindrical on their tread. But this conical form, although of great advantage when the carriage is passing the curves, yet it is very objectionable on the straight lines of the road; in consequence of the oscillating or serpentine motion which it gives to the carriage when under rapid speed, and the danger of the cars being thrown off the rail, or injury to the flanges of the wheel, and also to the road; this motion thus produced by the conical form of the wheel is also very injurious to the whole running gear of the carriage, straining the springs and pedestals asunder out of their proper position, and spreading the bearing boxes so that the axles sometimes get so much play as to endanger the cars running off the track.

The object of my invention is to avoid these objections and defects, to dispense, as much as possible with the conical form of the wheels, and at the same time to enable the cars to pass around the curves of the road with less friction and loss of power, than upon any plan heretofore used or known, and also to enable cars of great capacity to be built upon a plan much more simple, cheap, and safe than heretofore.

To enable me to accomplish these desirable results, and to increase the safety of the travel by causing the carriage to run more steadily upon the straight lines of road, I make a frame of about 50 feet in length if intended for an eight wheel carriage, or 30 feet, if intended for a six wheel carriage, as shown in the annexed drawing, (letter A,) or this frame may be made of any length, breadth, and strength that their use may require; upon this frame I place the body of the carriage, by means of bolsters, bolts, springs, or otherwise, as by experience found best. Under, and connecting to this frame by means of springs and bearing boxes or otherwise, I place the wheels and axles at such distances apart as may be found best to equalize the weight of the load upon all the wheels. The front pair of wheels under this frame I make with either one or two flanges to each wheel and slightly conical, and secured fast to and revolving with their axles in the usual way, as shown in the drawing by the letter B. The next, or middle pair of wheels, letter C, if for a six wheel carriage, or two pair if for an eight wheel, carriage I make cylindrical or nearly so at their tread, without any flanges, and loose upon their axles or otherwise, but so that each of these intermediate wheels may revolve independent of the other, and will do so at the curves of the road, and thereby avoid not only the impinging of the flanges against the side of the rails, but also the slipping of the tread or periphery of the wheel upon the upper surface of the rail of the road, causing great loss of power. But my improvement, that is, the middle, or intermediate wheels being made cylindrical, or nearly so, without flanges, and loose upon their axles, or separate axle for each wheel, are allowed to revolve independent of each other, as shown in drawings, letter C, enabling the car not only to pass the curves of the road with more safety, but with less loss of power, or danger of injury to the axles, and other parts of the running gear of the carriage; it also enables the car to run upon the straight lines of the road much more steadily and without that dangerous oscillating and serpentine motion in high speed, which is caused by the conical form of the wheels; all being made fast to their axles as heretofore has been the practice, both with wheels having flanges, as well as those without, for the general travel upon railroads. The hind pair of wheels and their axles on the same carriage I make in all respects similar to the front wheels, as described by letter B, because they are guide wheels also when running to and fro upon the road.

In order the better to be understood, I have described some things in connection with my improvement, which I do not claim as my invention, but—

That which I do claim, and wish to secure by Letters Patent, is—

The connecting and combining in the carriage for carrying burdens and passengers upon railroads, one or more intermediate pair of cylindrical wheels, or wheels nearly cylindrical, without flanges, loose upon their axles, or otherwise independent in their action, so that any one of these intermediate wheels may revolve faster or slower than the others, in connection with guide wheels having either one or two flanges, they being made fast to their axles, and also either for a six or eight wheel car all the wheels of the same carriage both fast and loose on their axles, being attached to one and the same stiff frame by means of springs and bearing boxes, or otherwise. This combination, in a railroad carriage as above described, I claim as new, and of my invention. I do not, however, claim cylindrical wheels on separate frames made fast to, and revolving with their axles, these having been used in steam locomotive engines as drivers; but I do claim the loose or independent wheels without flanges in connection with guide wheels having flanges and the attachment of the wheel to the one stiff frame, as above described.

ISAAC KNIGHT.

Witnesses:
L. C. DONN,
J. J. GREENOUGH.